(12) United States Patent
Fujikawa et al.

(10) Patent No.: US 8,264,838 B2
(45) Date of Patent: Sep. 11, 2012

(54) SUPPORTING STRUCTURE AND DISPLAY DEVICE

(75) Inventors: Hideyuki Fujikawa, Kawasaki (JP); Hirokatsu Kato, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 72 days.

(21) Appl. No.: 12/805,969

(22) Filed: Aug. 26, 2010

(65) Prior Publication Data

US 2010/0321869 A1  Dec. 23, 2010

Related U.S. Application Data

(63) Continuation of application No. PCT/JP2008/057091, filed on Apr. 10, 2008.

(51) Int. Cl.
*H05K 7/00* (2006.01)

(52) U.S. Cl. ......... 361/679.58; 361/679.05; 361/679.23; 248/122.1; 248/125.3; 248/220.22; 248/297.31; 248/917; 348/794

(58) Field of Classification Search ............. 361/679.01, 361/679.05, 679.23, 679.4, 679.58, 679.61; 248/125.3, 220.22, 297.31, 393, 397, 917–924; 348/794
See application file for complete search history.

(56) References Cited

U.S. PATENT DOCUMENTS

2005/0284991 A1\* 12/2005 Saez .......................... 248/122.1

FOREIGN PATENT DOCUMENTS

| JP | 2000-112376 | 4/2000 |
|---|---|---|
| JP | 2001-142408 | 5/2001 |
| JP | 2001-312219 | 11/2001 |
| JP | 2005-300922 | 10/2005 |
| JP | 3139696 | 2/2008 |

OTHER PUBLICATIONS

English Translation of the International Preliminary Report on Patentability dated Dec. 9, 2010 and issued in corresponding International Patent Application PCT/JP2008/057091.
Ken Oikawa, PFD Toritsuke Kozo Japan Institute of Invention and Innovation Journal of Technical Disclosure, Technical Disclosure No. 2006-502826, Date of Publication May 22, 2006.
International Search Report for PCT /JP2008/057091, mailed May 13, 2008.

\* cited by examiner

*Primary Examiner* — Robert J Hoffberg
(74) *Attorney, Agent, or Firm* — Staas & Halsey LLP

(57) ABSTRACT

A display device includes: a display-device main unit having a display screen on the front; a standing pole; a first support member having mounting holes arranged vertically with a predetermined pitch and fixed to the pole; and a second support member having threaded holes arranged vertically with the same pitch as the predetermined pitch and fewer than the mounting holes. The second support member is fixed to the back of the display-device main unit. One of the first support member and the second support member has an engaging hole, and the other has projections arranged vertically with the same pitch as the predetermined pitch and each capable of being inserted into the engaging hole. According to a projection that is one of the projections and inserted into the engaging hole, mounting holes among the mounting holes and as many as the threaded holes are connected to the threaded holes, respectively.

12 Claims, 20 Drawing Sheets

SUPPORTING STRUCTURE AND DISPLAY DEVICE

CROSS-REFERENCE TO RELATED APPLICATION

This is a continuation application of PCT/JP2008/057091, filed on Apr. 10, 2008.

FIELD

Embodiments discussed herein are directed to a supporting structure that supports a display-device main unit having a display screen on a front surface and a display device having the supporting structure.

BACKGROUND

Conventionally, there is known a structure that changes the installation height and the tilt of an electronic device having a display screen on the front, such as a TV monitor, a liquid crystal display and the like. The display screen may be placed at a position suitable for the height or the direction of a user's line of sight by changing the installation height and the tilt.

For example, Japanese Laid-open Patent Publication No. 2001-142408 describes a structure that causes an image display device to pivot and tilt and prevents the image display device from pivoting before the image display device is tilted at a predetermined angle.

Further, Japanese Laid-open Patent Publication No. 2005-300922 describes a structure that raises and lowers a display monitor by a friction mechanism.

In Japanese Laid-open Patent Publication No. 2001-142408, the structure is a combination of tilting and pivoting, and an adjustment of the height of the display screen is not considered. Further, the structure in Japanese Laid-open Patent Publication No. 2005-300922 is capable of adjusting the height, but the friction mechanism is employed and the structure is complicated and thus, the size may be large and the cost may be high.

In view of the foregoing, it is an object according to an aspect of the supporting structure and the display device to provide a simple structure in which a height of a display screen may be adjusted.

SUMMARY

According to an aspect of the invention, a display device includes: a display-device main unit that has a display screen on a front surface; a standing pole; a first support member that has plural mounting holes arranged vertically with a predetermined pitch and is fixed to the pole; and a second support member that has plural threaded holes arranged vertically with the same pitch as the predetermined pitch and fewer than the plural mounting holes and is fixed to a back surface of the display-device main unit. In the display device, one support member of the first support member and the second support member has an engaging hole, the other support member of the first support member and the second support member has plural projections which are arranged vertically with the same pitch as the predetermined pitch and each of which is capable of being inserted into the engaging hole, and according to a projection that is one of the plural projections and inserted into the engaging hole, the projections cause mounting holes that are among the plural mounting holes and as many as the plural threaded holes to connect to the plural threaded holes respectively.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Embodiment will be described below.

[Entire Structure]

Figure 1:
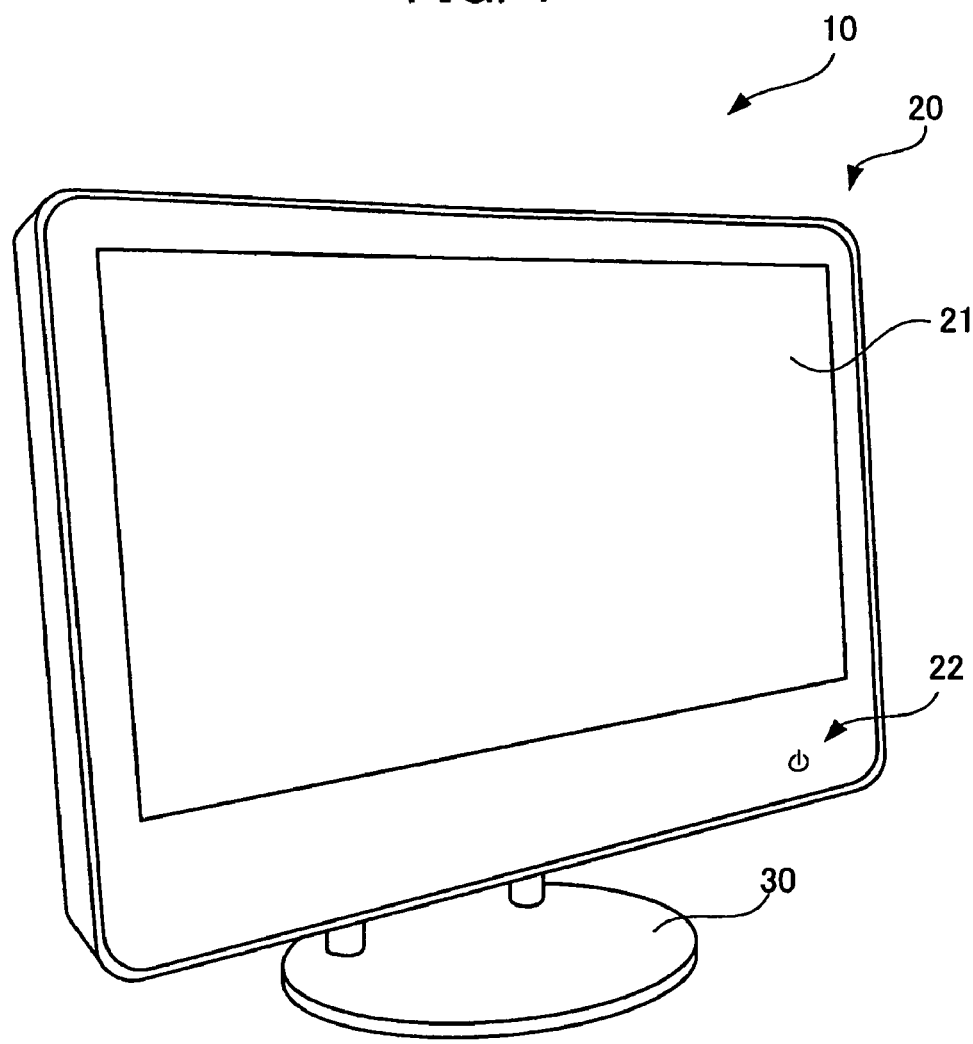
FIG. 1 is an external perspective view of a personal computer (PC)
Figure 2:
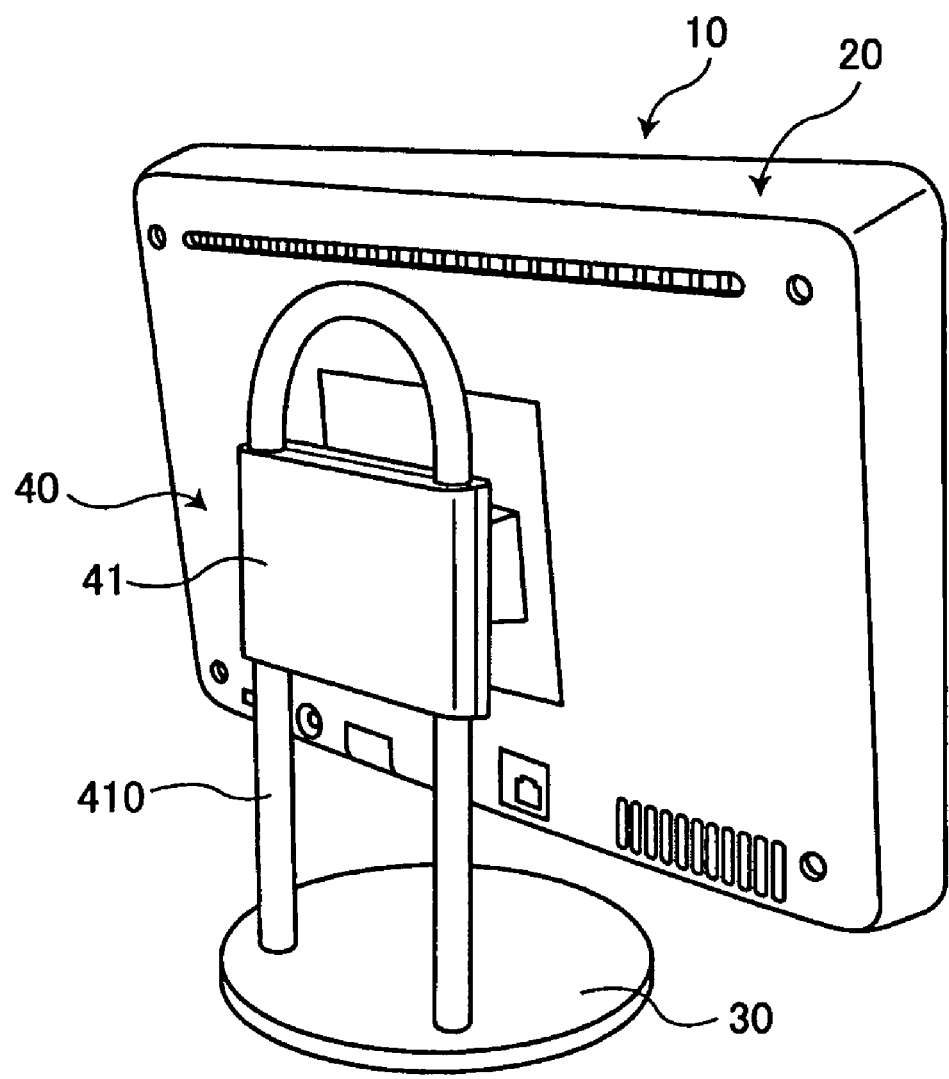
FIG. 2 is another external perspective view of the PC illustrated in FIG. 1 as viewed from back.

FIG. 1 is an external perspective view of a personal computer (hereinafter referred as "PC") 10, and FIG. 2 is another external perspective view of the PC 10 illustrated in FIG. 1 as viewed from back.

The PC 10 illustrated in FIG. 1 and FIG. 2 has a PC main unit 20 having a display screen 21 on the front. Displayed on the lower part of the front surface of the PC 10 is an icon 22 formed by silk printing. The icon 22 represents a power button. The PC main unit 20 can be turned on when a finger is placed on the icon 22.

The PC 10 illustrated in FIG. 1 and FIG. 2 has an operating circuit composed of a CPU and the like. The operating circuit is disposed in a housing of the PC main unit 20 holding the display screen 21. Specifically, the operating circuit is disposed at a position closer to the rear surface of the PC main unit 20, opposite to the front surface where the display screen 21 is disposed. Therefore, the PC 10 has general functions that allow the PC 10 to serve as a personal computer when a keyboard is additionally provided. Since there is no strong relationship between the keyboard and the embodiment, drawing and description of the keyboard are omitted.

The PC 10 illustrated in FIG. 1 and FIG. 2 also has a swivel 30 and a supporter 40 that supports the back surface of the PC main unit 20. The swivel 30 changes the orientation of the display screen 21 of the PC main unit 20. The supporter 40 supports the PC main unit 20 so that the PC main unit 20 is kept at a height desired by a user. As illustrated in FIG. 2, a cover 41 made of resin is provided to hide the internal support structure of the supporter 40.

[Swivel]

Figure 3:
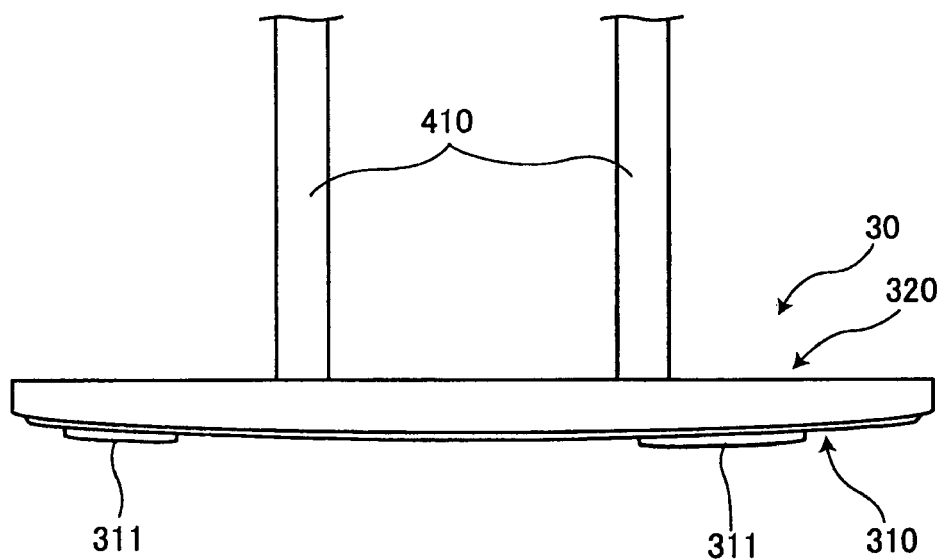
FIG. 3 is a side view of a swivel.
Figure 4:
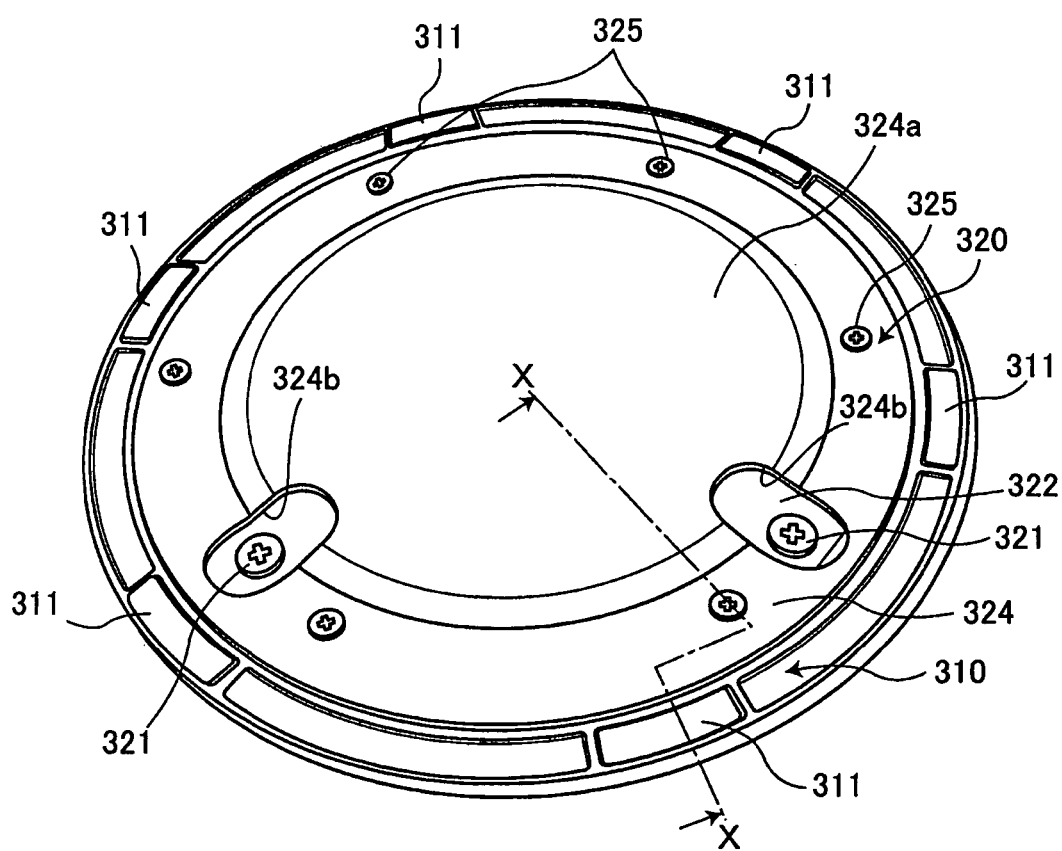
FIG. 4 is a bottom view of the swivel.
Figure 5:
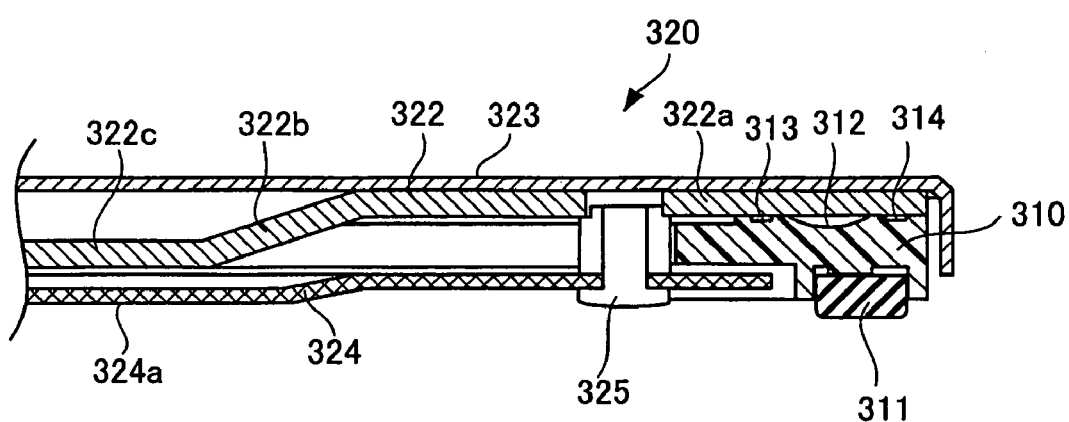
FIG. 5 is a cross-sectional view of the swivel taken along a line X-X in FIG. 4.

FIG. 3 is a side view of the swivel 30, and FIG. 4 is a bottom view of the swivel 30. FIG. 5 is a cross-sectional view of the swivel 30 taken along a line X-X in FIG. 4.

The swivel 30 has a circular fixed base 310 provided with rubber feet 311 projecting from the bottom surface of the fixed base 310. The swivel 30 also has a movable stage 320 disposed in contact with the top surface of the fixed base 310 and capable of pivoting relative to the fixed base 310.

As illustrated in FIG. 4, the rubber feet 311 are disposed at positions (six in this example) spaced uniformly in a circumferential direction. The rubber feet 311 are provided for the purpose of enabling the circular swivel 30 to stay firmly without sliding, when the swivel 30 is put on, for example, a desk.

FIG. 4 further illustrates two large screws 321 provided to fix a pole 410 to the swivel 30 by engaging in screw holes (not shown) formed on the bottom surface of the pole 410. The pole 410 is a part of the supporter 40 (refer to FIG. 2).

As illustrated in FIG. 5, the circular fixed base 310 has a grease pool 312 that is a hollow formed on the top surface of the fixed base 310 to hold grease. In order to prevent the grease from leaking outside, circular grooves 313 and 314 are formed in the inner side and the outer side of the grease pool 312, respectively.

Further, the movable stage 320 has a stand plate 322, a stand cover 323 and a sole plate 324.

The stand plate 322 is a plate member rotatable by sliding on the top surface of the fixed base 310 while being in contact with that top surface. The shape of the stand plate 322 is formed by: a slide section 322a; a downward slant 322b; a circular flat section 322c; an upward slant 322d; and another circular flat section 322e (see FIG. 5 and FIG. 8). The slide section 322a is in contact with the top surface of the fixed base 310. The downward slant 322b is provided at the inner side of the slide section 322a and slanted toward the inner side of the circle formed by the fixed base 310, i.e. toward the center of the stand plate 322. The circular flat section 322c is provided at the inner side of the slide section 322a, and the height of the circular flat section 322c is lower than that of the fixed base 310. The upward slant 322d is provided at the inner side of the flat section 322c and slanted toward the center of the stand plate 322. The circular flat section 322e is provided at the inner side of the upward slant 322d, the height of the circular flat section 322e is equal to that of the slide section 322a. In this way, the surface of the stand plate 322 is formed to be vertically uneven, improving the strength of the stand plate 322. Further, holes 322f in which the screws 321 for fixing the pole 410 to be inserted are formed in the stand plate 322 (see FIG. 8).

The stand cover 323 is a member that covers the top surface as well as the most part of the lateral surface of the stand plate 322, and forms the appearance of the swivel 30.

Further, the sole plate 324 is a plate member that covers the bottom surface of the swivel 30. The sole plate 324 is fixed to the stand plate 322 by screws 325. Also, the sole plate 324 has a central part 324a formed to project downward, making the sole plate 324 stronger than a simple flat plate. Further, the sole plate 324 has holes 324b formed at positions corresponding to the screws 321 for fixing the pole 341 so that the pole 341 can be attached or detached without removing the sole plate 324.

Figure 6:
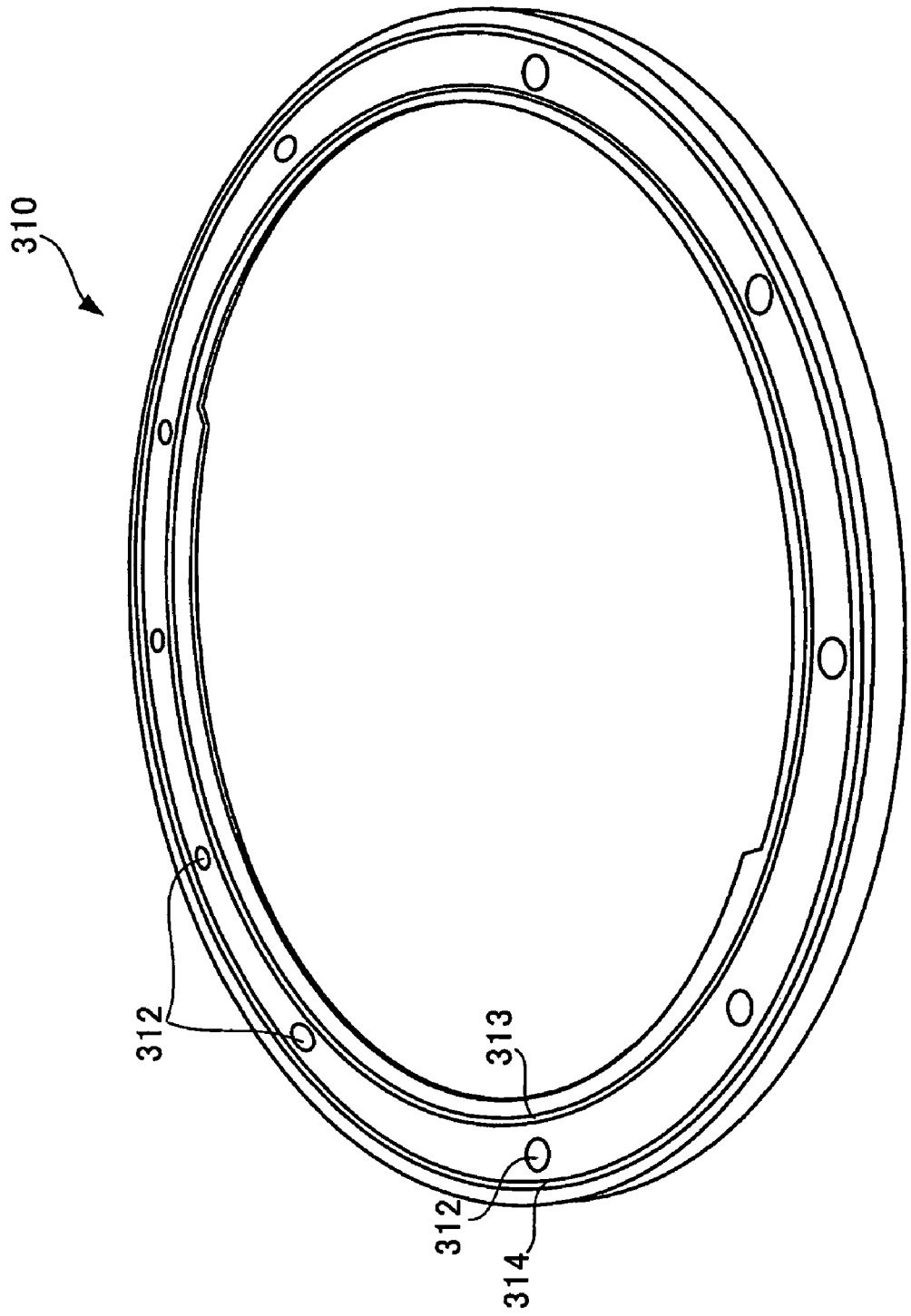
FIG. 6 is a perspective view of the top surface of a circular fixed base.
Figure 7:
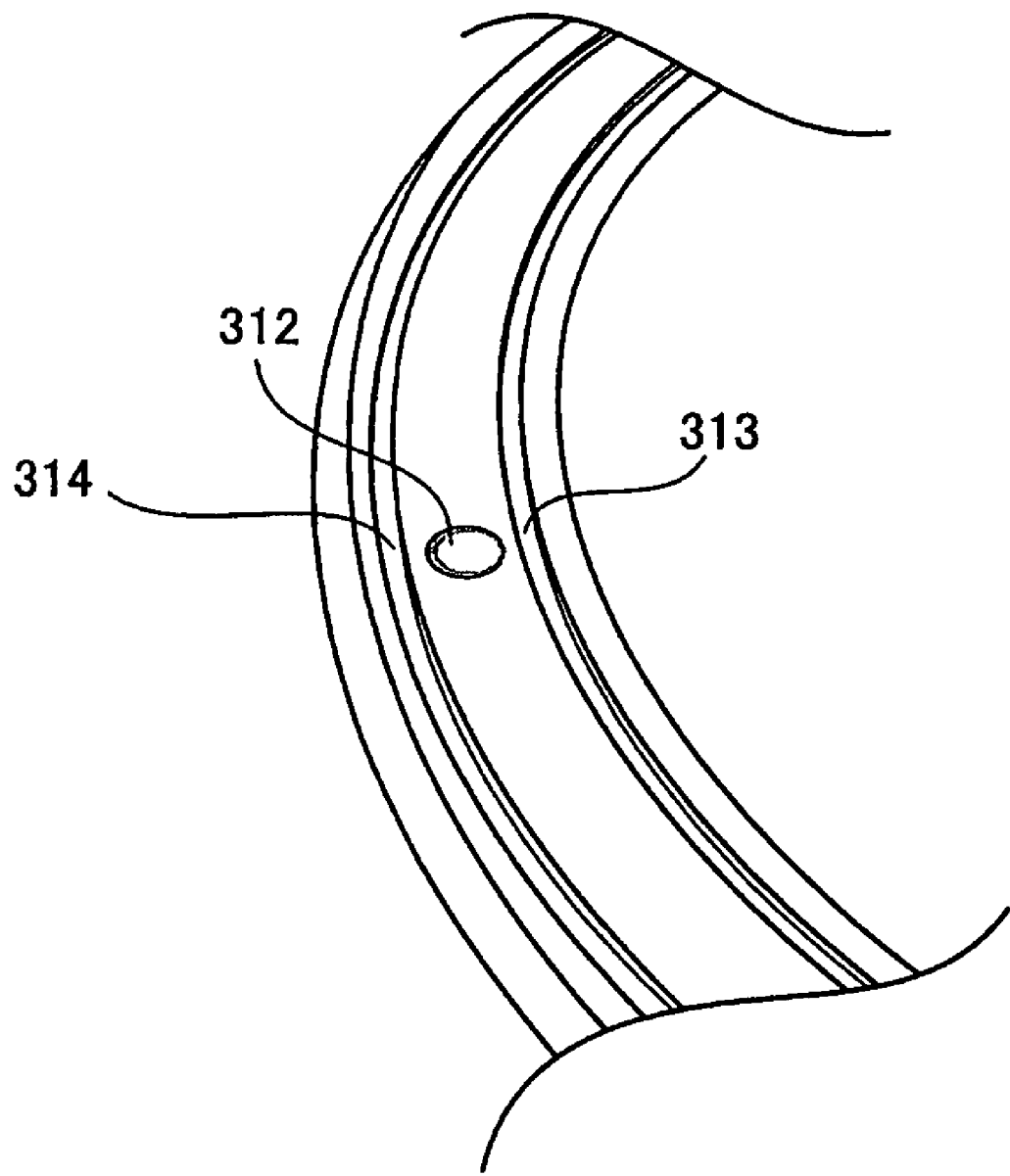
FIG. 7 is an enlarged view of a part of the fixed base illustrated in FIG. 6.

FIG. 6 is a perspective view of the top surface of the circular fixed base 310, and FIG. 7 is an enlarged view of a part of the fixed base 310 illustrated in FIG. 6.

The fixed base 310 has the grease pools 312 spaced in a circumferential direction. Holding the grease in the grease pools 312 improves the sliding property of the stand plate 322 of the movable stage 320 disposed on the fixed base 310.

Also, the grooves 313 and 314 are formed on the top surface of the fixed base 310, specifically, in the inner side and the outer side of the grease pools 312, respectively. These grooves 313 and 314 are provided to prevent the grease overflowing the grease pools 312 from leaking outside the fixed base 310.

Figure 8:
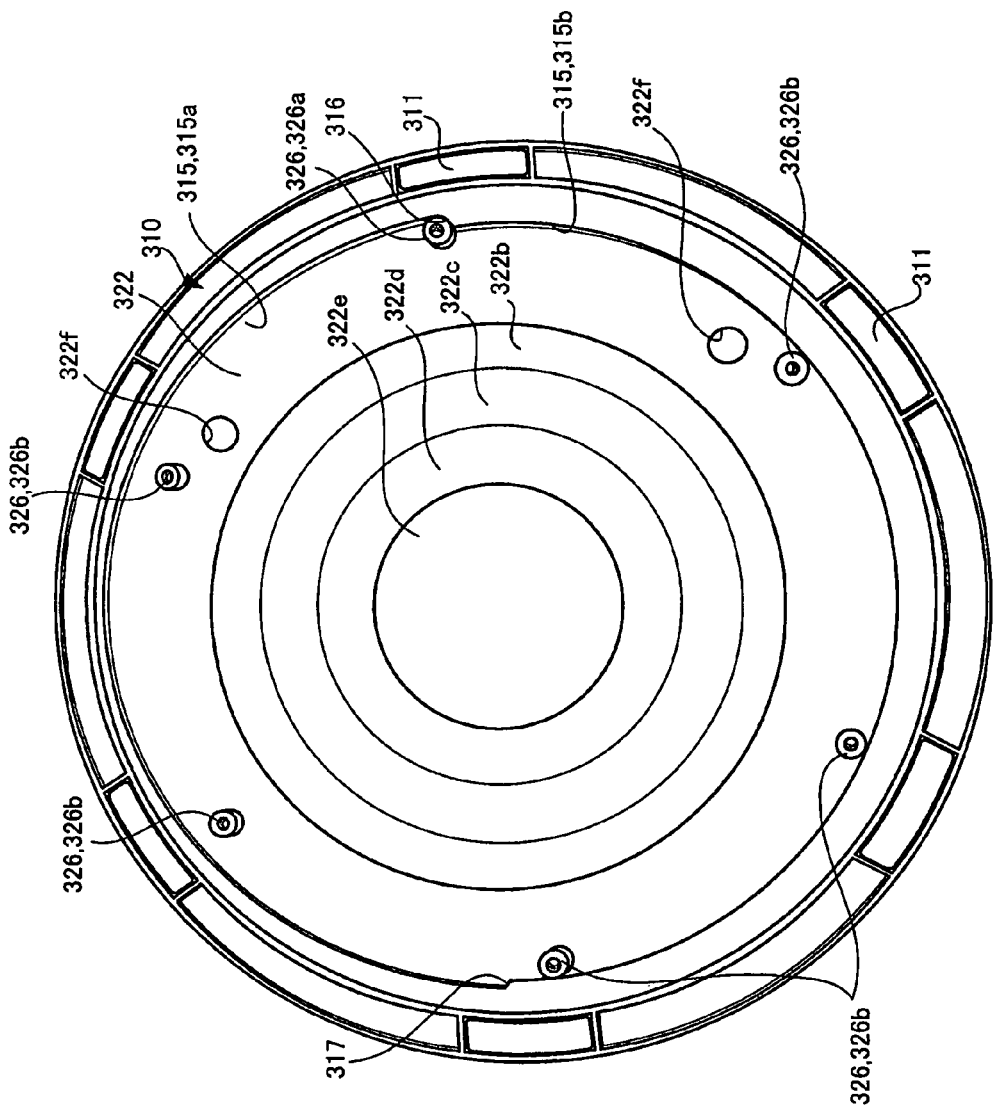
FIG. 8 is a diagram illustrating the fixed base and a stand plate disposed on the fixed base as viewed from bottom.
Figure 9:
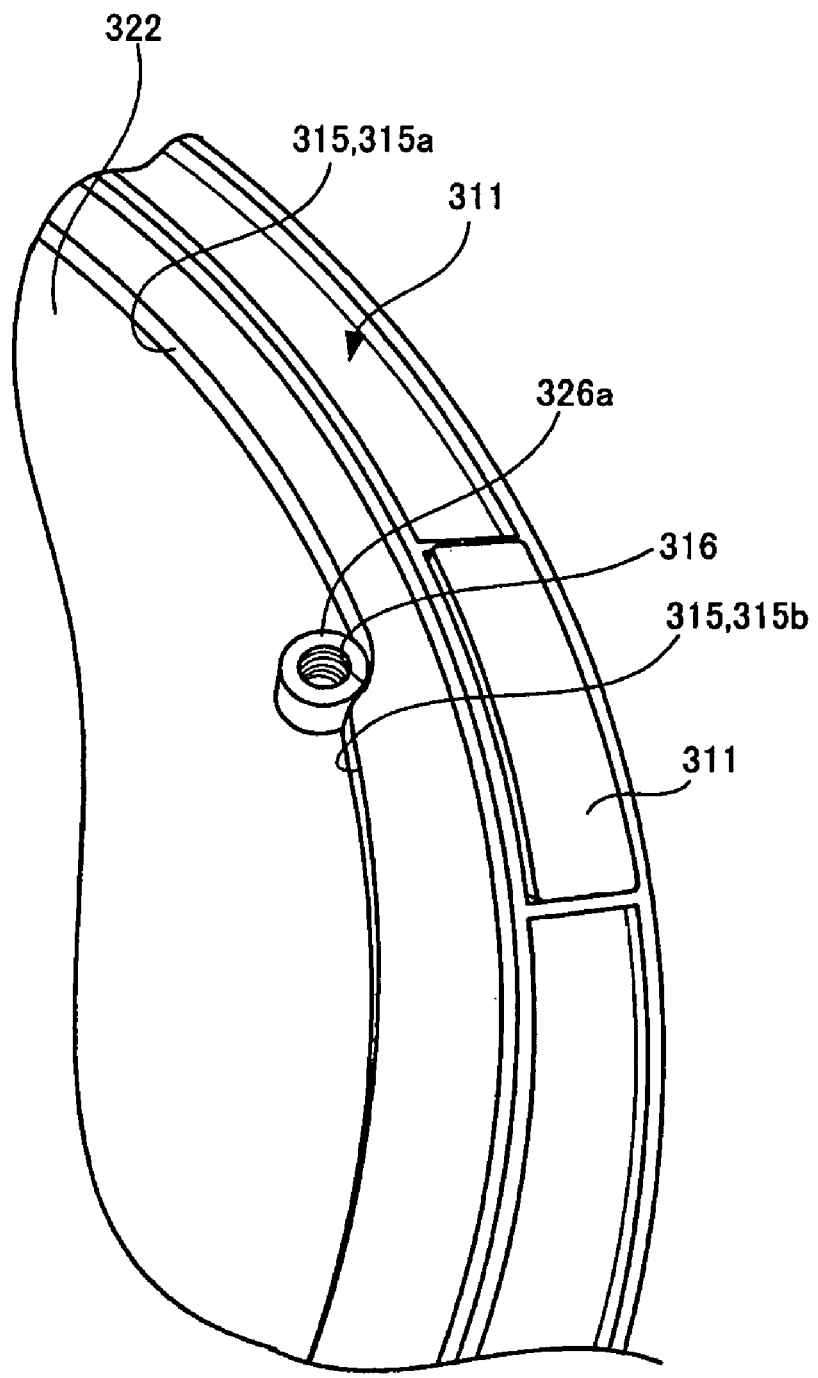
FIG. 9 is an enlarged view of a part of the bottom view illustrated in FIG. 8.

FIG. 8 illustrates the fixed base 310 and the stand plate 322 disposed on the fixed base 310 as viewed from bottom, and FIG. 9 is an enlarged view of a part of FIG. 8. In FIG. 8 and FIG. 9, the sole plate 324 and the pole 410 are removed.

The sole plate 324 (refer to FIG. 4) is fixed to the stand plate 322 with screws 325, which are inserted into screw holes formed in the respective centers of six bosses 326 standing on the bottom surface of the stand plate 322.

Here, the fixed base 310 has an inner end surface 315 that defines an inner annulus of the fixed base 310. The inner end surface 315 is divided into two parts, an inner end surface 315a with a long radius and an inner end surface 315b with a short radius, by two stoppers 316 and 317 serving as boundaries. The radius of the inner end surface 315b is shorter than the radius of the inner end surface 315a by the difference between the stoppers 316 and 317. Only a boss 326a, one of the bosses 326 standing on the bottom surface of the stand plate 322, is in contact with the inner end surface 315a with the large radius. The remaining five bosses 326b are formed at positions where the bosses 326b can touch the inner end surface 315b with the short radius.

The rotation angle of the stand plate 322 is regulated by the boss 326a and the two stoppers 316 and 317.

FIG. 8 and FIG. 9 illustrate the boss 326a in the state of abutting the stopper 316. This is the state in which the stand plate 322 is at one end of the rotation angle of the stand plate 322. In this state of the inner end surface 315 of the fixed base 310, as illustrated in FIG. 8, the positions of the stand plate 322 and the fixed base 310 are regulated by the boss 326a and three of the five remaining bosses 326b.

Figure 10:
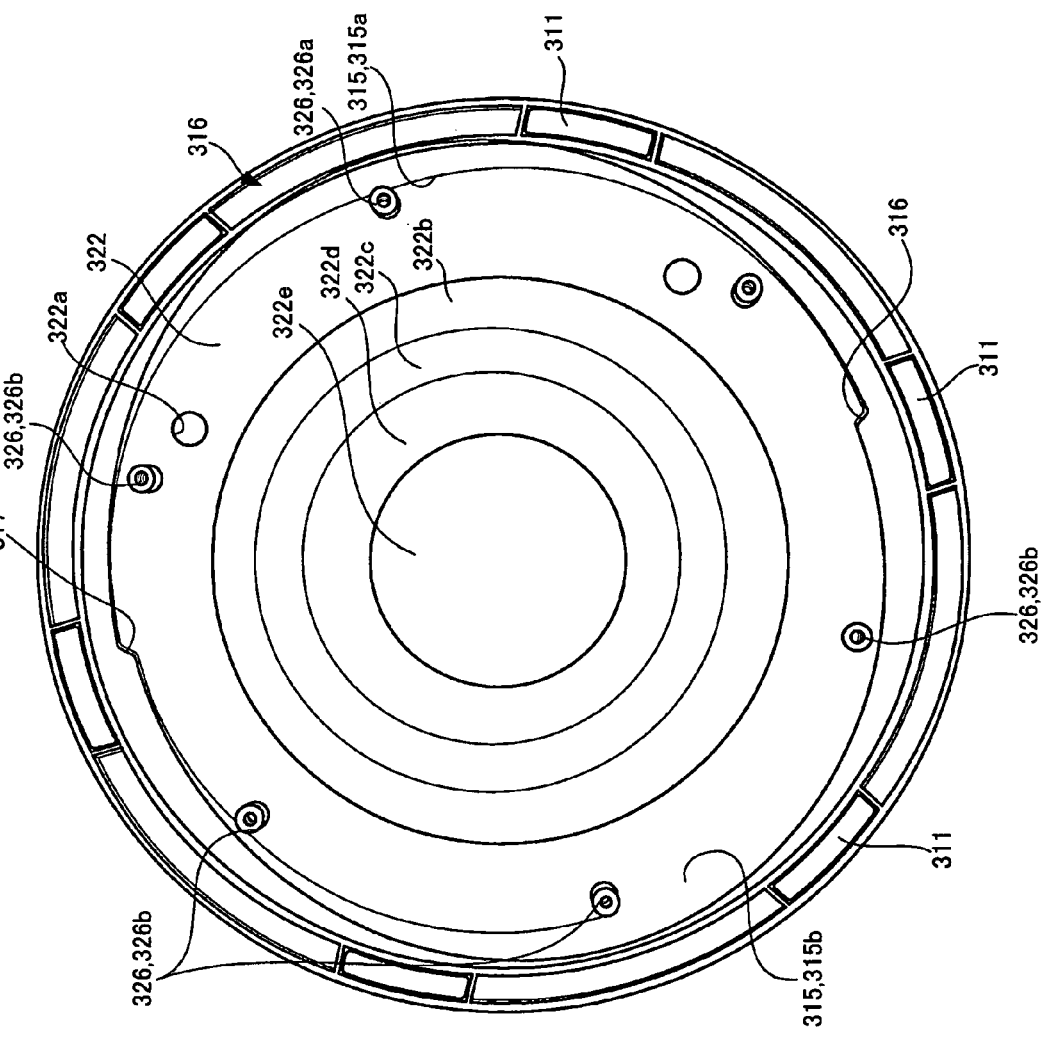
FIG. 10 is a diagram similar to FIG. 8 and illustrates the fixed base and the stand plate as viewed from bottom.

FIG. 10 is similar to FIG. 8 and illustrates the fixed base 310 and the stand plate 322 as viewed from bottom. FIG. 10 illustrates a state in which the stand plate 322 is turned from the state illustrated in FIG. 8.

In FIG. 10, the stand plate 322 is turned from the state illustrated in FIG. 8, and the boss 326a is at a position away from both of the stoppers 316 and 317. Like FIG. 8, the position of the inner end surface 315 of the fixed base 310 is regulated by the boss 326a and other three of the remaining five bosses 326b.

Figure 11:
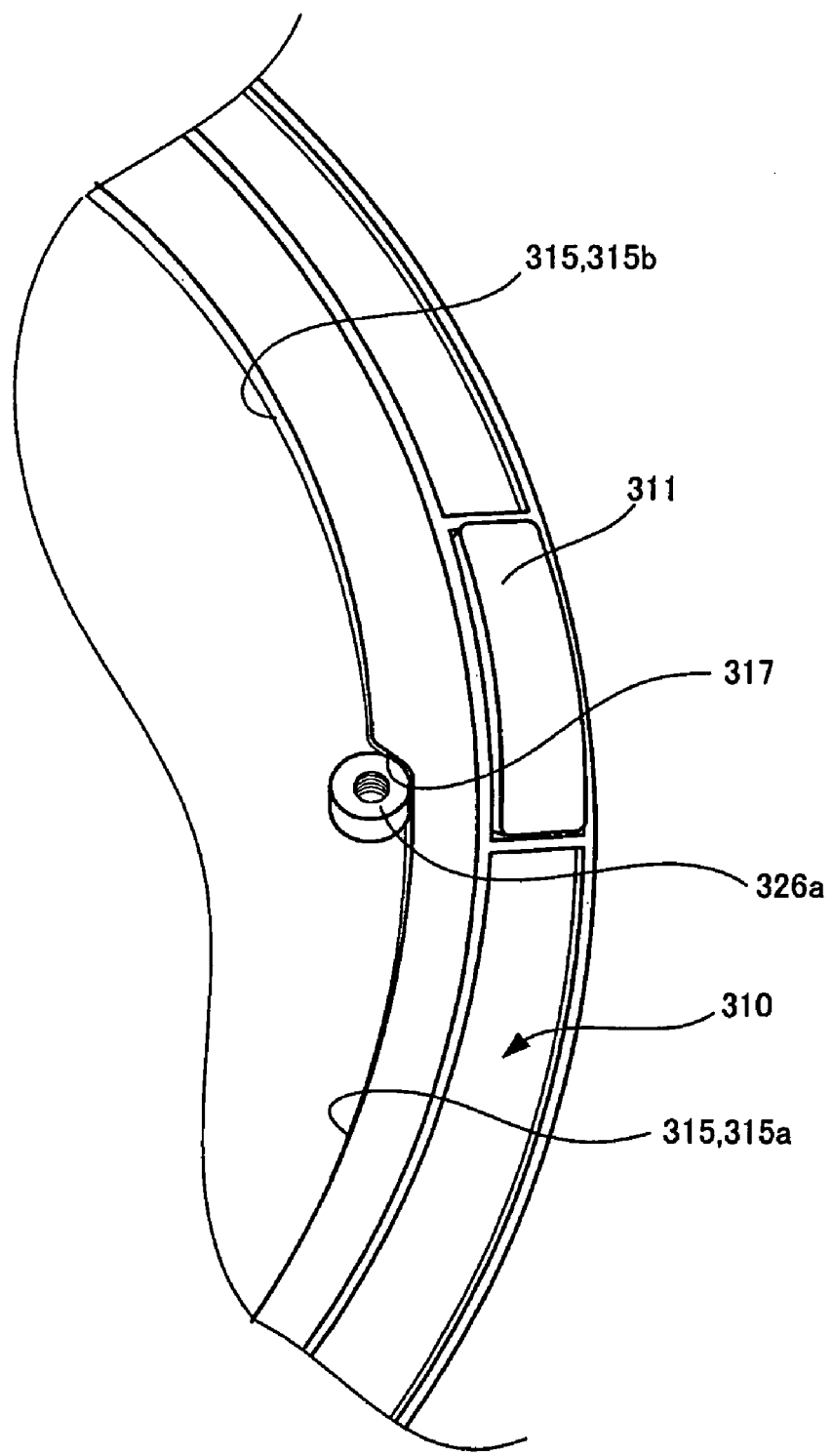
FIG. 11 is an enlarged view of a part of the stand plate, which is in the state of being turned up to an end opposite to the end shown in FIG. 8 and FIG. 9.

FIG. 11 is an enlarged view of a part of the stand plate 322, which is in the state of being turned up to the other end opposite to the one end shown in FIG. 8 and FIG. 9.

The boss 326a abuts the stopper 317, not the stopper 316 illustrated in FIG. 8 and FIG. 9, thereby defining the other limit of the rotation of the stand plate 322.

In this way, the structure for regulating the rotation angle is employed in the swivel 30. In this structure, the angle of the orientation of the display screen 21 illustrated in FIG. 1 is regulated to be within a range of about 160 degrees. This is a range sufficient to adjust the orientation of the display screen 21. And besides, limiting the range of the orientation of the display screen 21 in this way can prevent the following problem. Although not shown in FIG. 1 and FIG. 2, various cords and cables are connected to the PC main unit 20 when the PC main unit 20 is actually in use. If the PC main unit 20 is freely rotatable at any angle, the cords and cables are very likely to wind around the PC main unit 20. Accordingly, the limited range of the rotation makes it possible to prevent such undesirable winding of the cords and cables.

[Support Structure]

As illustrated in FIG. 2, for example, the pole 410 is disposed to stand on the swivel 30, and the back surface of the PC main unit 20 is attached to the pole 410.

Figure 12:
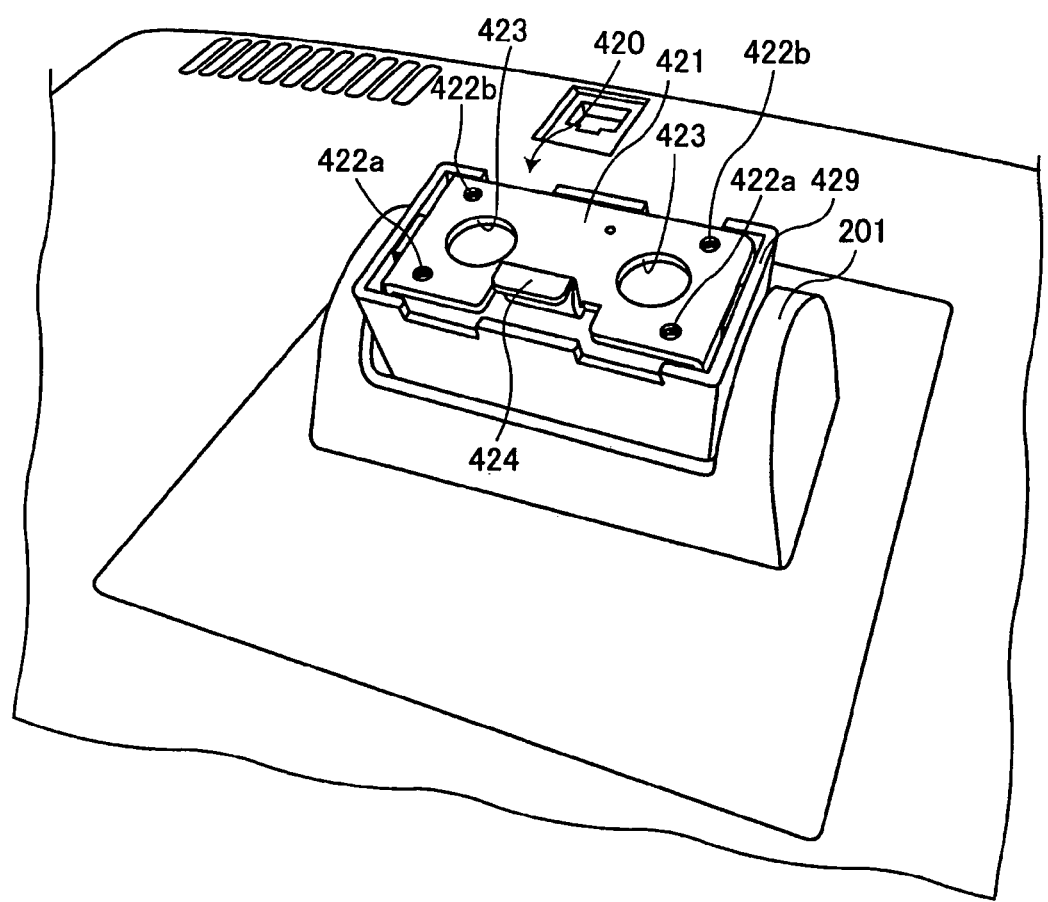
FIG. 12 is a perspective view of a mounting metallic component provided on the back surface of a PC main unit.

FIG. 12 is a perspective view of a mounting metallic component 420 provided on the back surface of the PC main unit 20.

The mounting metallic component 420 is fixed to the back surface of the PC main unit 20 to attach the PC main unit 20 to the pole 410 (refer to FIG. 2). The mounting metallic component 420 has a mounting surface 421 for attaching the PC main unit 20 to the pole 410. The entire mounting metallic component 420 other than the mounting surface 421 is covered with a protrusion 201 of the housing of PC main unit 20 and a resin frame 429, in view of design and safety.

On the mounting surface 421 of the mounting metallic component 420, a pair of vertically aligned threaded holes 422a and 422b are formed at each of the right side and the left side, i.e. four threaded holes in total are formed. Further, an engaging hole 423 is formed at each of the right side and the left side of the mounting surface 421, and a hook 424 is formed at an upper central part (illustrated at a lower part of the mounting surface 421 in FIG. 12).

Figure 13:
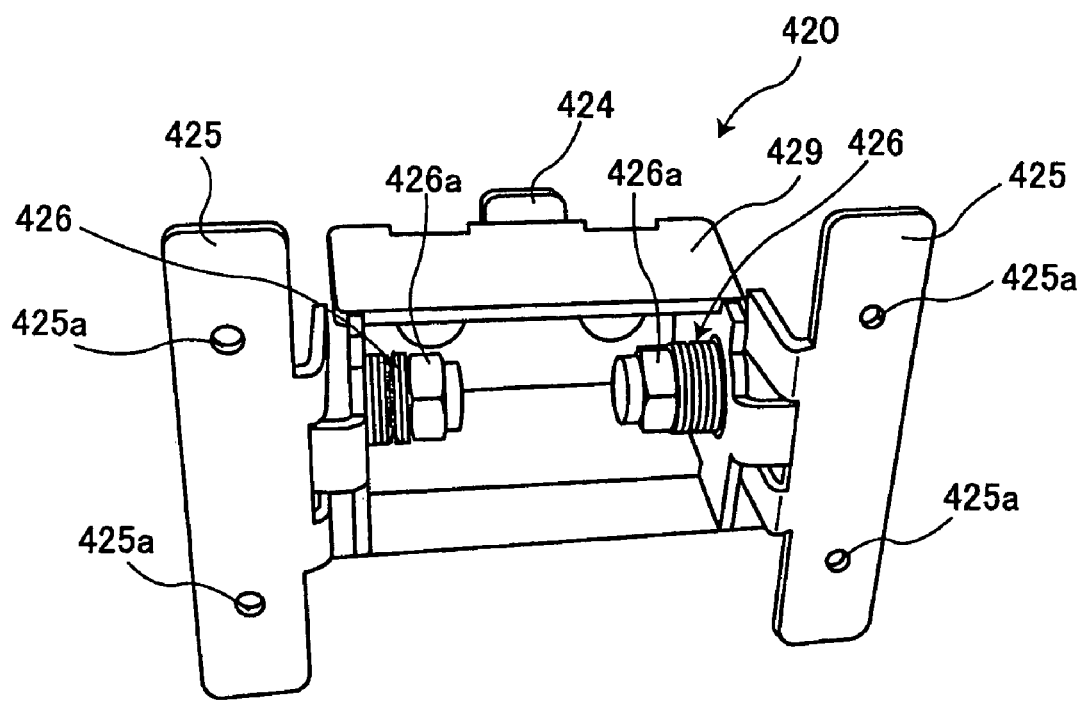
FIG. 13 is a perspective view of the mounting metallic component removed from the back surface of the PC main unit, as viewed from the PC main unit.

FIG. 13 is a perspective view of the mounting metallic component 420 removed from the back surface of the PC main unit, as viewed from the PC main unit.

As illustrated in FIG. 13, two fixing sections 425 for fixing the mounting metallic component 420 to the PC main unit 20 by screws are provided at the right and left sides of the mounting metallic component 420. Each of the fixing sections 425 has two mounting holes 425a. The mounting metallic component 420 is secured to the PC main unit 20 by these mounting holes 425a.

Also, as illustrated in FIG. 13, a frictional fastening section 426 is provided at each of the right side and the left side of the mounting metallic component 420. This is a structure that allows the display screen 21 of the PC main unit 20 to tilt up and down within some angular range.

The force required to tilt the display screen 21 is adjusted by turning a nut 426a provided at each of the frictional fastening sections 426.

Figure 14:
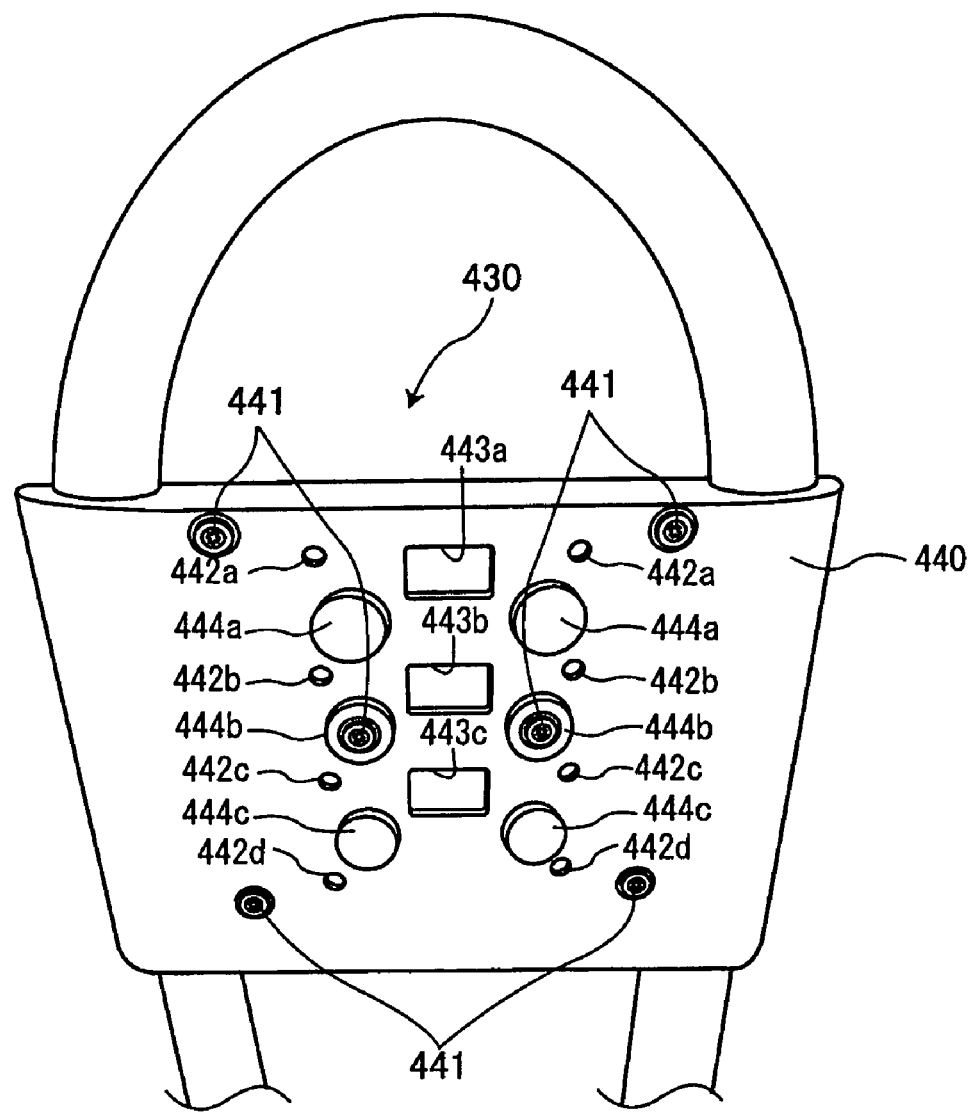
FIG. 14 is a diagram of a monitor mounting member fixed to a pole, as viewed from the PC main unit.

FIG. 14 is a diagram of a monitor mounting member 430 fixed to the pole 410, as viewed from the PC main unit 20.

As illustrated in FIG. 2, the pole 410 is formed to extend upward and makes a U-turn to extend downward. The pole 410 is composed of two posts extending in parallel to each other except for the upper part of the pole 410 where the two posts are joined. The monitor mounting member 430 is secured to these vertically extending two parallel posts. The monitor mounting member 430 has a resin board 440 illustrated in FIG. 14 and a metal plate 450 disposed at the back of the resin board 440 where the metal plate 450 is hidden (cf. FIG. 15). The resin board 440 is fixed to the metal plate 450 by six screws.

In the resin board 440, one set of vertically aligned through holes 442a, 442b, 442c and 442d is formed at each of the left and right sides. These through holes 442a, 442b, 442c and 442d are formed at the same spacing as that between the vertically aligned threaded holes 422a and 422b illustrated in FIG. 12. In a central part between the two columns of the through holes 442a, 442b, 442c and 442d, hook through holes 443a, 443b and 443c are vertically aligned at regular intervals. Further, between the column of these hook through holes 443a, 443b and 443c and each of the two columns of the through holes 442a, 442b, 442c and 442d, three projections 444a, 444b and 444c are vertically aligned. In the center of the projection 444b, which is positioned in the middle of the three projections 444a, 444b and 444c, a hole (not shown) is formed to serve as a screw fastening section used for attachment to the metal plate 450 (cf. FIG. 15). Each of these projections 444a, 444b and 444c has outer dimensions that allow them to be inserted into the engaging hole 423 illustrated in FIG. 12.

Figure 15:
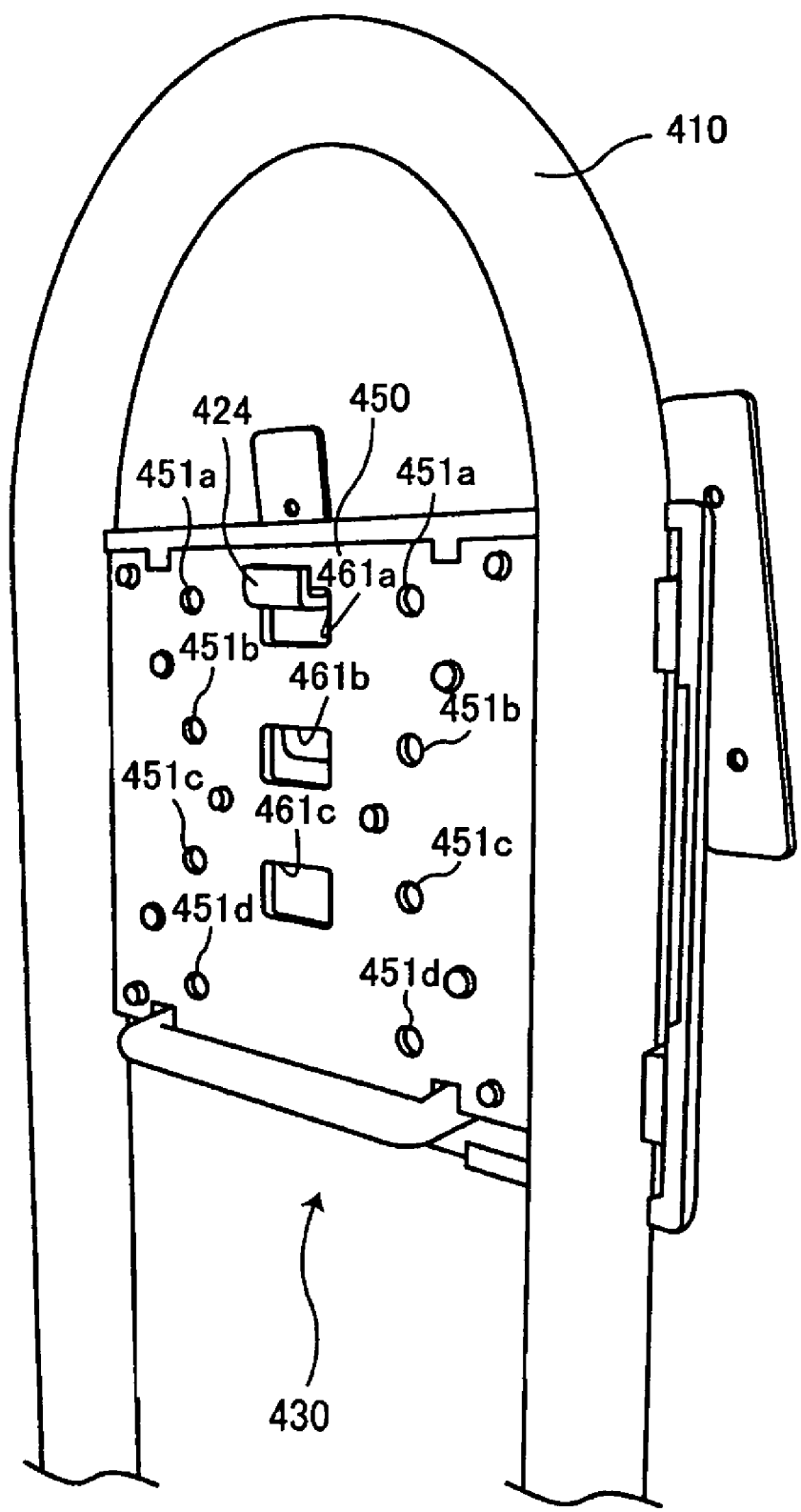
FIG. 15 is a perspective view of the monitor mounting member as viewed from the direction of a metal plate.

FIG. 15 is a perspective view of the monitor mounting member 430 as viewed from the direction of the metal plate 450.

In the metal plate 450, one set of vertically aligned mounting holes 451a, 451b, 451c and 451d is formed at each of the right and left sides. The mounting holes 451a, 451b, 451c and 451d are vertically aligned at the same spacing as that between the vertically aligned threaded holes 422a and 422b illustrated in FIG. 12. In a central part between the two columns of the mounting holes 451a, 451b, 451c and 451d, hook locking holes 461a, 461b and 461c are vertically aligned at regular intervals.

Here, the mounting holes 451a, 451b, 451c and 451d in each of the two columns formed at the right and left sides are formed at positions respectively aligned with the corresponding through holes 442a, 442b, 442c and 442d illustrated in FIG. 14. The mounting holes 451a, 451b, 451c and 451d are formed at the same spacings as those of the threaded holes 422a and 422b illustrated in FIG. 12 in both the vertical and lateral directions.

The vertically aligned hook locking holes 461a, 461b and 461c formed on the metal plate 450 are also provided at positions that respectively correspond to the positions of the vertically aligned hook through hole 443a, 443b and 443c formed on the resin board 440.

Here, as illustrated in FIG. 15, the hook 424 of the mounting metallic component 420 illustrated in FIG. 12 is engaged in the hook locking hole 461a that is the uppermost one of the three hook locking hole 461a, 461b and 461c. In this state, the uppermost projection 444a among the vertically aligned projections 444a, 444b and 444c formed on the resin board 440 illustrated in FIG. 14 is fit in the engaging hole 423 illustrated in FIG. 12. Further, the uppermost mounting hole 451a among the four vertically aligned mounting holes 451a, 451b, 451c and 451d is positioned to match the upper threaded hole 422a of the vertically aligned threaded holes 422a and 422b illustrated in FIG. 12, and the second mounting hole 451b is positioned to match the lower threaded hole 422b. When the two mounting holes 451a and 451b and the two threaded holes 422a are 422b are used in this state to secure the PC main unit 20 (cf. FIG. 1) with screws, the PC main unit 20 can be fixed in the uppermost position.

Figure 16:
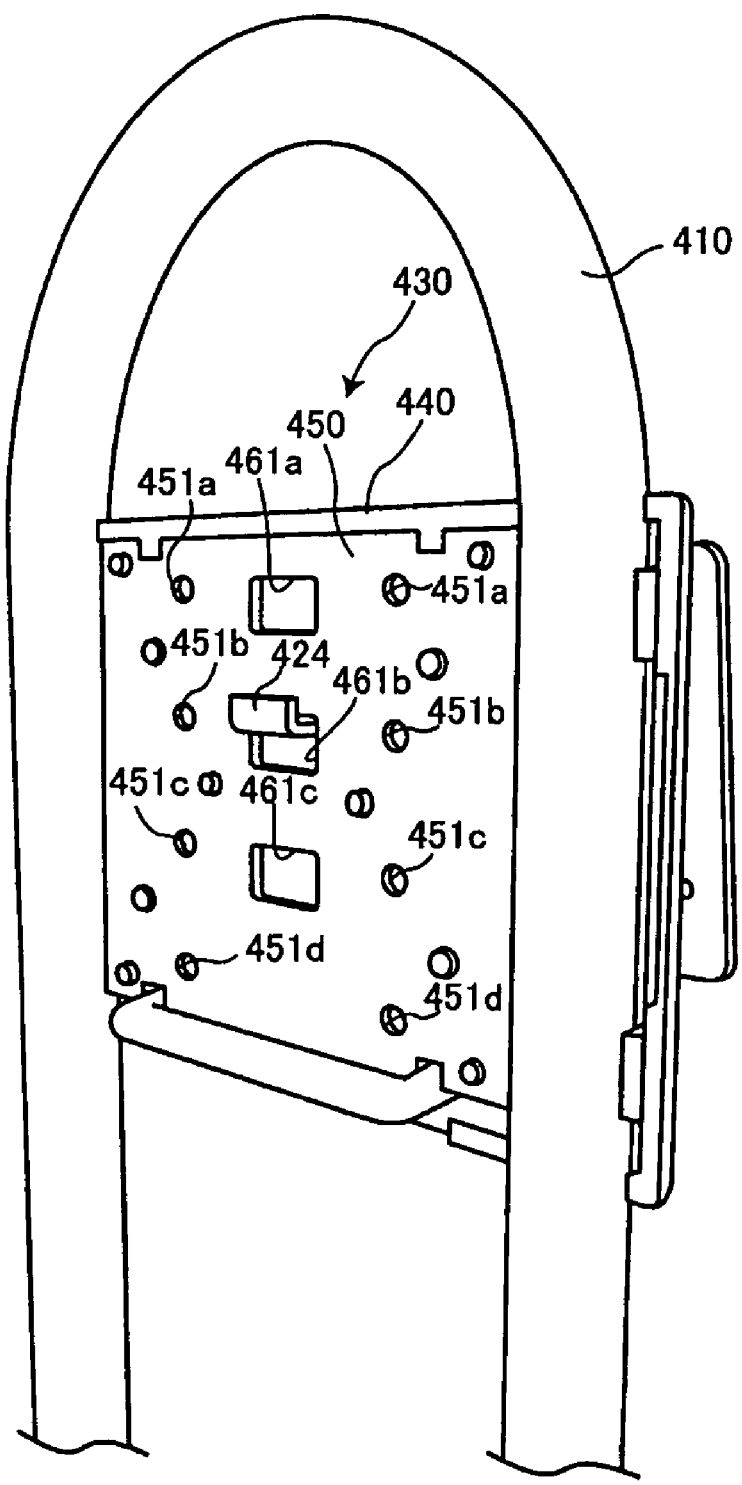
FIG. 16 is a diagram similar to FIG. 15 and illustrates the state in which a hook is engaged in the middle hook locking hole.

FIG. 16 is a diagram similar to FIG. 15, but illustrates the state in which the hook 424 is engaged in the middle hook locking hole 461b.

As illustrated in FIG. 16, the hook 424 of the mounting metallic component 420 illustrated in FIG. 12 is engaged in the hook locking hole 461b that is the second one of the three hook locking hole 461a, 461b and 461c. In this state, the second projection 444b among the vertically aligned projections 444a, 444b and 444c formed on the resin board 440 illustrated in FIG. 14 is fit in the engaging hole 423 illustrated in FIG. 12. Further, the second uppermost mounting hole 451b among the four vertically aligned mounting holes 451a, 451b, 451c and 451d is positioned to match the upper threaded hole 422a of the vertically aligned threaded holes 422a and 422b illustrated in FIG. 12, and the third mounting hole 451c is positioned to match the lower threaded hole 422b. When the two mounting holes 451b and 451c and the two threaded holes 422a are 422b are used in this state to secure the PC main unit 20 (cf. FIG. 1) with screws, the PC main unit 20 can be fixed in the position slightly lower than the position illustrated in FIG. 15.

Figure 17:
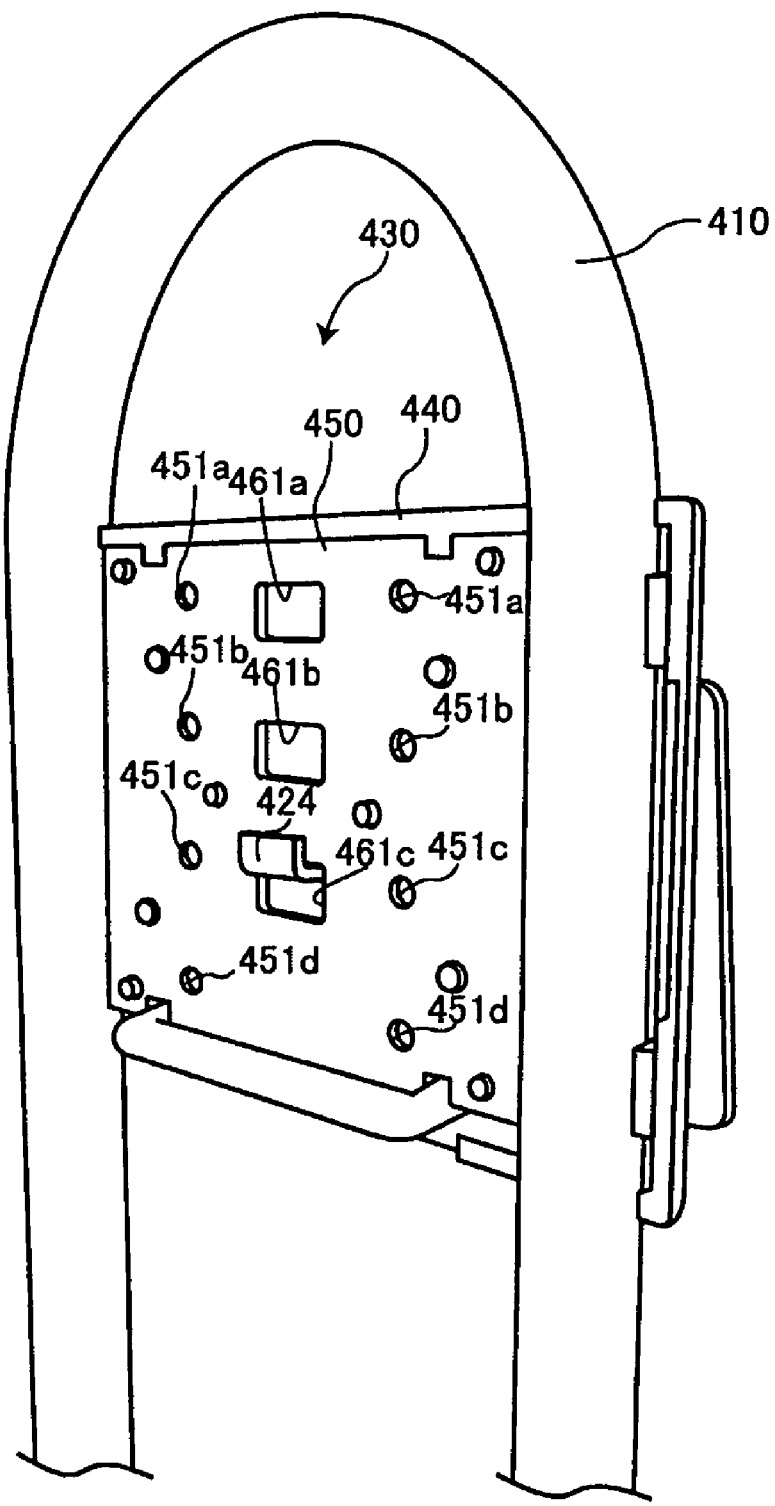
FIG. 17 is a diagram similar to FIG. 15 and FIG. 16 and illustrates the state in which the hook is engaged in the lowermost hook locking hole.

FIG. 17 is a diagram similar to FIG. 15 and FIG. 16, but illustrates the state in which the hook 424 is engaged in the lowermost hook locking hole 461c.

As illustrated in FIG. 17, the hook 424 of the mounting metallic component 420 illustrated in FIG. 12 is engaged in the hook locking hole 461c that is the lowermost one of the three hook locking hole 461a, 461b and 461c. In this state, the lowermost projection 444c among the vertically aligned projections 444a, 444b and 444c formed on the resin board 440 illustrated in FIG. 14 is fit in the engaging hole 423 illustrated in FIG. 12. Further, the third mounting hole 451c among the four vertically aligned mounting holes 451a, 451b, 451c and 451d is positioned to match the upper threaded hole 422a of the vertically aligned threaded holes 422a and 422b illustrated in FIG. 12, and the lowermost mounting hole 451d is positioned to match the lower threaded hole 422b. When the two mounting holes 451b and 451c and the two threaded holes 422a are 422b are used in this state to secure the PC main unit 20 (cf. FIG. 1) with screws, the PC main unit 20 can be fixed in the lowermost position.

Here, in the mounting metallic component 420 illustrated in FIG. 12, the two vertically aligned threaded holes 422a are 422b are formed, but three or more vertically aligned threaded holes may be formed to realize a stronger fastening structure.

Also, as illustrated in FIG. 14, the four mounting holes 442a, 442b, 442c, 442d are vertically aligned. However, the number of the mounting holes may be three as long as they can vertically adjust the height of the PC main unit 20 to either one of two stages. Further, the number of the mounting holes may be five or more so that the height of the PC main unit 20 can be adjusted to any one of three or more stages. However, the number of the vertically aligned mounting holes is larger than the number of the vertically aligned threaded holes of the mounting metallic component 420 illustrated in FIG. 12.

Also, as illustrated in FIG. 14, the number of the vertically aligned projections 444a, 444b and 444c is three, but it is not limited to three as long as the number corresponds to the number of the stages to which the height of the PC main unit 20 can be adjusted. This is also true for the number of the hook locking holes 461a 461b and 461c illustrated in FIG. 15.

Further, in the embodiment described above, the hook 424 is provided in the mounting metallic component 420 illustrated in FIG. 12, and the hook locking holes 426a, 426b and 426c are formed in the monitor mounting member 430. However, their structures may be reversed, i.e. the monitor mounting member 430 may be provided with hooks while the mounting metallic component 420 may be provided with hook locking holes.

Furthermore, in the embodiment described above, the engaging hole 423 is formed in the mounting metallic component 420, and the projections 444a, 444b and 444c to fit in the engaging hole 423 are formed in the monitor mounting member 430. However, their structures may also be reversed. In other words, the monitor mounting member 430 may be provided with engaging holes and the mounting metallic component 420 may be provided with projections.

Note that FIG. 14 to FIG. 17 illustrates the states in which the cover 41 made of resin is removed. After the adjustment of the height is completed and the PC main unit 20 is secured by screws, the cover 41 illustrated in FIG. 2 is placed to cover the metal plate 450 and is secured to the periphery of the resin board 440. As a result, the state in which the supporter 40 is covered as illustrated in FIG. 2 is realized.

[Icon Representation]

Figure 18:
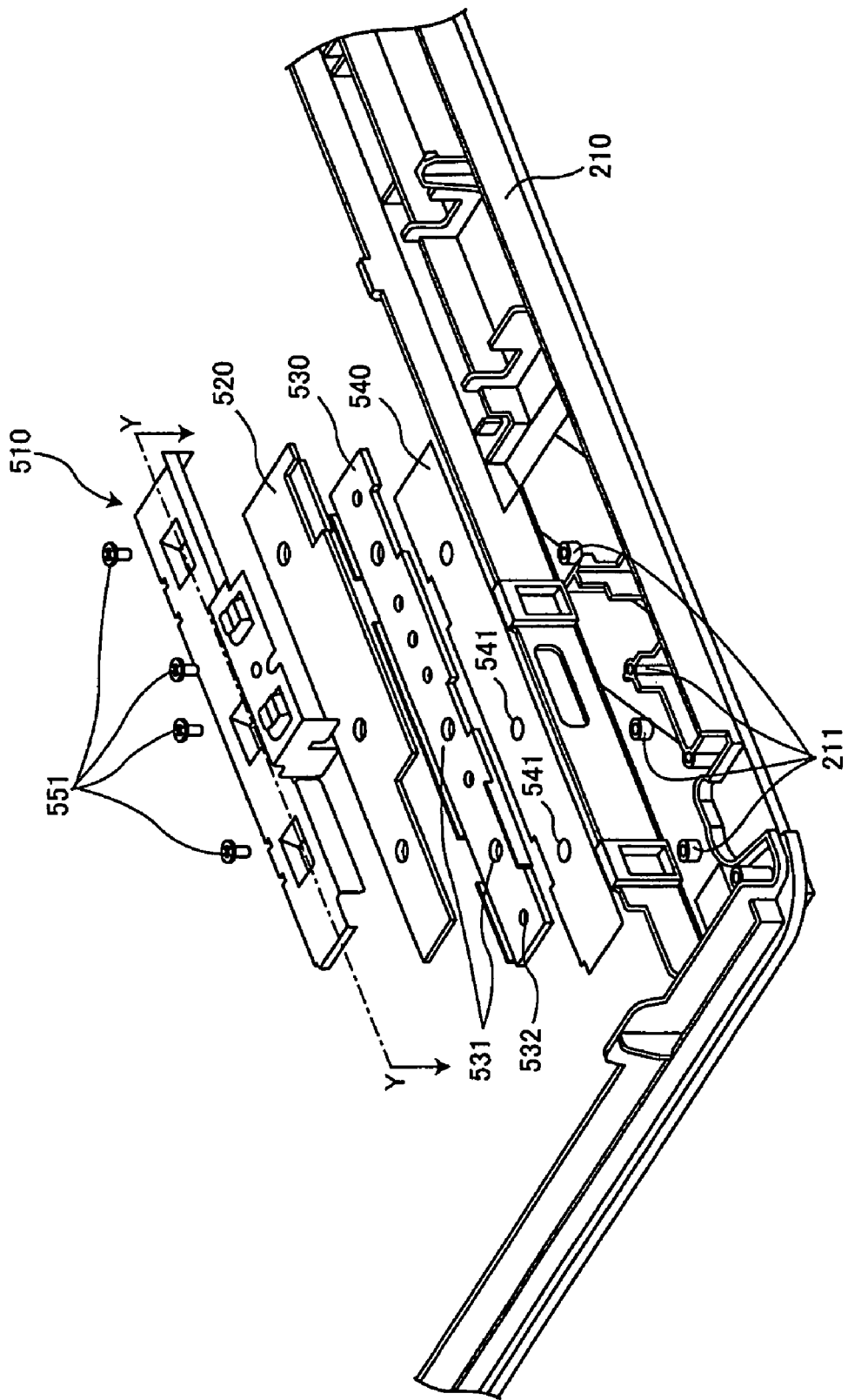
FIG. 18 is an exploded perspective view of the inside of a lower right corner of the front surface (where a display screen is disposed) of the PC main unit.
Figure 19:
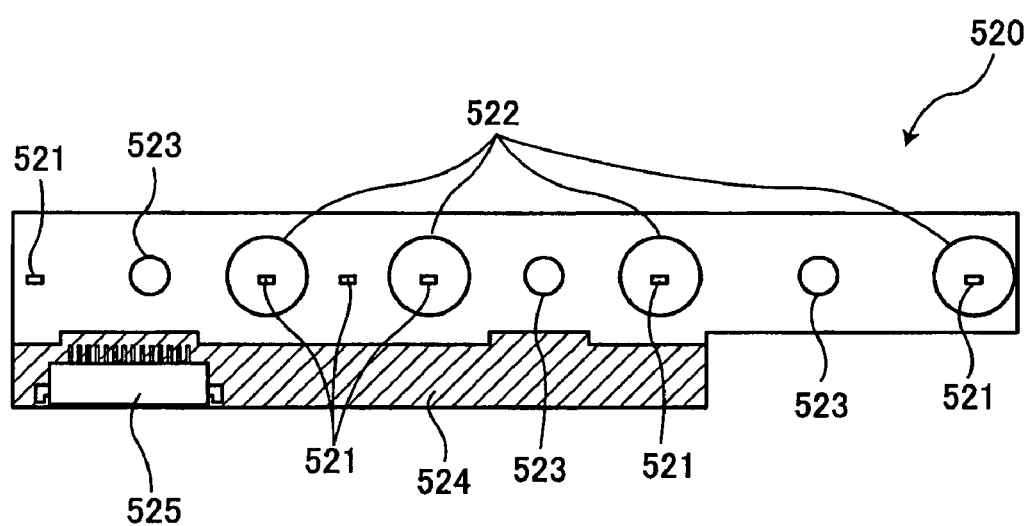
FIG. 19 is a plan view of the structure of a substrate included in the exploded perspective view illustrated in FIG. 18.
Figure 20:
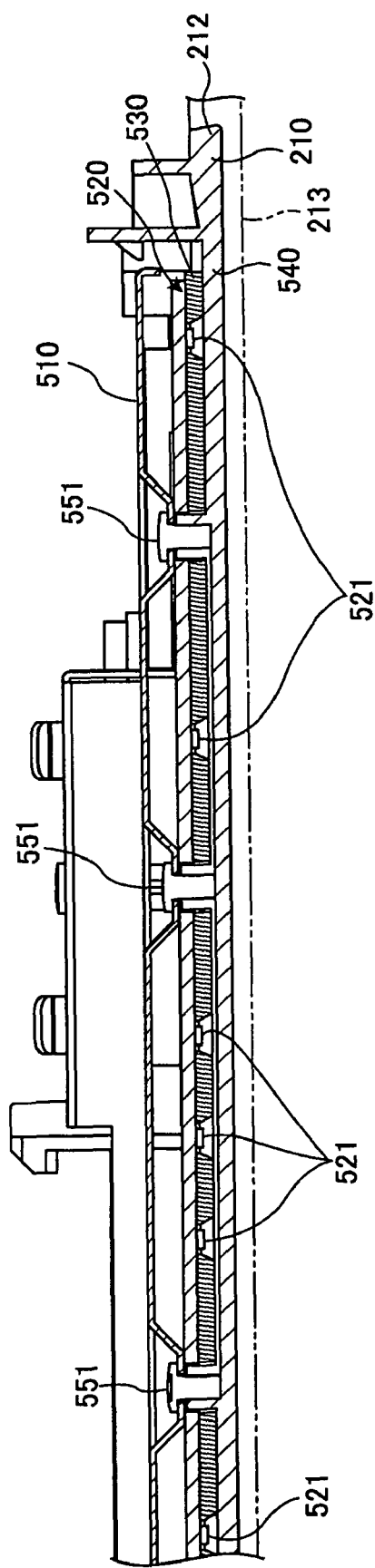
FIG. 20 is a cross-sectional view of a part taken along an arrow Y-Y illustrated in FIG. 18.

FIG. 18 is an exploded perspective view of the inside of a lower right corner of the front surface (where the display screen 21 is disposed) of the PC main unit 20 (see FIG. 1). FIG. 19 is a plan view of the structure of a substrate 520 included in the exploded perspective view illustrated in FIG. 18. FIG. 20 is a cross-sectional view of a part taken along an arrow Y-Y in FIG. 18.

Illustrated in the lowermost part of FIG. 18 is the shape of an inner surface of a front cover 210. The front cover 210 forms a part of a housing of the PC main unit 20 illustrated in FIG. 1 and is shaped like a frame surrounding the display screen 21. In the part covered by the front cover 210, a shield board 510, the substrate 520, a spacer 530, and an icon sheet 540 are stacked in this order with the shield board 510 on the top, and fixed by inserting four screws 551 into holes formed in the respective centers of bosses 211 standing on the inner surface of the front cover 210.

As illustrated in FIG. 19, plural LEDs 521 are disposed on the substrate 520, and electrodes 522 for a touch sensor are also formed so as to correspond to and surround some of the LEDs 521.

Further, holes 523 for fixing by the screws 551 (cf. FIG. 18) are formed on the substrate 520. Also, a circuit placement section 524 for the touch sensor is formed (specific description of the circuit being omitted), and a connector 525 for communications with the outside such as receipt of electric power and transmission of signals is provided.

The spacer 530 is provided to keep a predetermined distance between the substrate 520 and the icon sheet 540. In addition, mounting holes 531 for fixing by screws and holes 532 for passing light from the LEDs 521 disposed on the substrate 520 are formed in the spacer 530.

The icon sheet 540 is opaque except for a light transmitting section (icon, not shown) which is formed on a light path for light from the LEDs 521 disposed on the substrate and whose shape defines the outline of passing light. Also, holes 541 for fixing by screws are formed in the icon sheet 540.

The shield board 510 is provided to cover the substrate 520, thereby preventing the touch sensor disposed on the substrate 520 from malfunctioning due to electromagnetic noise from the outside.

As illustrated in FIG. 20, the front cover 210 has a base 212 made of transparent resin and a film 213 formed by applying a coating to the outer surface of the base 212. The film 213 is provided to hide the inside of the front cover 210 so that the inside can not be seen from the outside, and also serves to show light emitted from the LEDs 521 disposed on the substrate 520 and passing through the icon sheet 540. Various icons appear on the front cover 210 only after the PC main unit 20 illustrated in FIG. 1 is turned on, causing the LEDs 521 disposed on the substrate 520 to emit light. Therefore, when the PC main unit 20 is turned off, a neat and simple appearance can be achieved, improving the design. On the other hand, when the PC main unit 20 is turned on thereby causing the LEDs to emit light, the user can readily recognize the fact that the PC main unit 20 is turned on.

As described above, each of the electrodes 522 for the touch sensor is disposed to surround the corresponding LED 521 on the substrate 520. When a finger is placed to touch an icon that appears on the front cover 21 because of light from the LED 521 disposed in the center of the electrode 522, the touch sensor responds so that the PC main unit 20 starts an operation according to the touch sensor. Here, the example illustrated in FIG. 18 through FIG. 20 does not have a moving section thereby achieving a relatively simple structure, while being able to serve in a manner similar to a push button, so that low profile and high resistance are realized.

As an exception however, the icon 22 representing the existence of the power button is formed on the front cover 210 by silk printing as illustrated in FIG. 1. This is because the LEDs 521 start emitting light only after power-on, and it is necessary to indicate the location of the power button before the LEDs 521 emit light, i.e. before power-on. Incidentally, the touch sensor for realizing the power button is in the state in which power is supplied to minimum required parts so that the touch sensor can respond even before power-on.

Note that the above-described PC main unit 20 is a PC mounted with an operating circuit which is composed of a CPU and the like and disposed in a housing of the main unit of the PC holding a display screen. However, the disclosure of the present application may be applied to a PC having: a display unit holding a display screen; and a main unit provided with an operating circuit which is composed of a CPU and the like, in which the two units are separate elements and connected to each other with a cable. Further, the disclosure of the present application may also be applied to devices such as TV monitors other than PCs.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A display device comprising:
    a display-device main unit having a display screen on a front surface;
    a standing pole;
    a first support member having a plurality of mounting holes, the plurality of mounting holes arranged vertically with a predetermined pitch, and the first support member is fixed to the standing pole; and
    a second support member having a plurality of threaded holes arranged vertically with a pitch the same as the predetermined pitch of the plurality of mounting holes, a number of the plurality of threaded holes is fewer than a number of the plurality of mounting holes, and the second support member is fixed to a back surface of the display-device main unit,
    wherein one support member of the first support member and the second support member has an engaging hole, another support member of the first support member and the second support member has a plurality of projections, the plurality of projections arranged vertically with a pitch the same as the predetermined pitch of the plurality of mounting holes and each of the plurality of projections is capable of being inserted into the engaging hole, and when one of the plurality of projections is inserted into the engaging hole, each of the plurality of threaded holes is aligned with a respective one of the plurality of mounting holes.

2. The display device according to claim 1, wherein one of the one support member and the another support member has a plurality of hook locking holes vertically arranged with the same pitch as the predetermined pitch, and
    another of the one support member and the another support member has a hook capable of engaging in any of the plurality of hook locking holes, the hook is provided at a position where when the one of the plurality of projections is inserted into the engaging hole, the hook is engaged in one of the plurality of hook locking holes.

3. The diplay device according to claim 2, wherein the plurality of projections and the plurality of hook locking holes are formed in the first support member, and the engaging hole and the hook are formed in the second support member.

4. The display device according to claim 3, wherein the first support member includes a metallic body and a resin body,
    the metallic body has the plurality of mounting holes and the plurality of hook locking holes are formed therein,
    the metallic body is fixed to the pole,
    the resin body is disposed at a position overlapping a surface on the second support member side of the metallic body, the resin body is locked on the metallic body, and a plurality of screw through holes and a plurality of hook through holes are formed in the resin body, each of the plurality of screw through holes is aligned with a respective one of the plurality of mounting holes, and each of the plurality of hook through holes are aligned with a respective one of the plurality of hook locking holes.

5. The display device according to claim 3, wherein the second support member includes a metallic body has the plurality of threaded holes, the engaging hole and the hook are formed therein.

6. The display device according to claim 4, wherein the second support member includes a metallic body has the plurality of threaded holes, the engaging hole and the hook are formed therein.

7. The display device according to claim 1, wherein the standing pole is formed by two rod-like bodies extending in parallel with each other and an upper part, the standing pole extends from a bottom of a first one of the two rod-like bodies to a top of the first one of the two rod-like bodies and then reversing at the upper part to extend from a top of a second one of the two rod-like bodies to a bottom of the second one of the two rod-like bodies, the first support member is fixed to the two rod-like bodies.

8. The display device according to claim 1, wherein a plurality of pairs of the plurality of mounting holes of the first support member are laterally aligned and a plurality of pairs of the plurality of threaded holes of the second support member are laterally aligned, the plurality of pairs of the plurality of mounting holes are aligned with the plurality of pairs of the plurality of mounting holes.

9. The display device according to claim 1, further comprising an image generation section that generates an image displayed on the display screen.

10. A support structure that supports a display-device main unit having a display screen on a front surface, so that the display screen faces in a lateral direction, the support structure comprising:
  a standing pole;
  a first support member having a plurality of mounting holes arranged vertically with a predetermined pitch, the first support member fixed to the standing pole; and
  a second support member having a plurality of threaded holes arranged vertically with a pitch the same as the predetermined pitch of the plurality of mounting holes, a number of the plurality of threaded holes is fewer than a number of the plurality of mounting holes, and the second support member is fixed to a back surface of the display-device main unit,
  wherein one support member of the first support member and the second support member has an engaging hole, another support member of the first support member and the second support member has a plurality of projections, the plurality of projections arranged vertically with a pitch the same as the predetermined pitch of the plurality of mounting holes and each of the plurality of projections is capable of being inserted into the engaging hole, and when one of the plurality of projections is inserted into the engaging hole each of the plurality of threaded holes is aligned with a respective one of the plurality of mounting holes.

11. The support structure according to claim 10, wherein one of the one support member and the another support member has a plurality of hook locking holes vertically arranged with the same pitch as the predetermined pitch, and
  another of the one support member and the another support member has a hook capable of engaging in any of the plurality of hook locking holes, and the hook is provided at a position where when the one of the plurality of projections is inserted into the engaging hole, the hook is engaged in one of the plurality of hook locking holes.

12. The support structure according to claim 11, wherein the plurality of projections and the plurality of hook locking holes are formed in the first support member, and the engaging hole and the hook are formed in the second support member.

* * * * *

UNITED STATES PATENT AND TRADEMARK OFFICE
CERTIFICATE OF CORRECTION

| | |
|---|---|
| PATENT NO. | : 8,264,838 B2 |
| APPLICATION NO. | : 12/805969 |
| DATED | : September 11, 2012 |
| INVENTOR(S) | : Hideyuki Fujikawa et al. |

It is certified that error appears in the above-identified patent and that said Letters Patent is hereby corrected as shown below:

Column 10, Line 28, In Claim 3, delete "diplay" and insert -- display --, therefor.

Signed and Sealed this
Twentieth Day of November, 2012

David J. Kappos
*Director of the United States Patent and Trademark Office*